US012119201B2

(12) United States Patent
McElroy et al.

(10) Patent No.: US 12,119,201 B2

(45) Date of Patent: Oct. 15, 2024

(54) CATHODE HEATER ASSEMBLY AND METHOD OF MANUFACTURE

(71) Applicant: Elve Inc., Davis, CA (US)

(72) Inventors: Colin Andrew McElroy, Sacramento, CA (US); Michelle Gonzalez, Woodland, CA (US); Diana Gamzina Daugherty, Davis, CA (US); Mikhail Kuffel, Sacramento, CA (US); Danny Chan, San Mateo, CA (US)

(73) Assignee: Elve Inc., Davis, CA (US)

( * ) Notice: Subject to any disclaimer, the term of this patent is extended or adjusted under 35 U.S.C. 154(b) by 0 days.

(21) Appl. No.: 18/368,940

(22) Filed: Sep. 15, 2023

(65) Prior Publication Data

US 2024/0096583 A1 Mar. 21, 2024

Related U.S. Application Data

(60) Provisional application No. 63/459,226, filed on Apr. 13, 2023, provisional application No. 63/407,136, filed on Sep. 15, 2022.

(51) Int. Cl.
*H01J 23/04* (2006.01)
*H01J 9/04* (2006.01)

(52) U.S. Cl.
CPC ................ *H01J 23/04* (2013.01); *H01J 9/04* (2013.01)

(58) Field of Classification Search
CPC ................. H01J 1/28; H01J 23/04; H01J 9/04
See application file for complete search history.

(56) References Cited

U.S. PATENT DOCUMENTS 3,283,200 A 11/1966 Pallakoff
4,626,470 A * 12/1986 Yamamoto ................ H01J 1/14 428/472
5,006,753 A * 4/1991 Hasker ...................... H01J 1/28 445/51
5,064,397 A * 11/1991 Hasker ...................... H01J 1/28 445/50
5,289,076 A * 2/1994 Lee ........................... H01J 1/26 313/45
6,034,469 A 3/2000 Uda et al.
6,091,187 A 7/2000 Golladay et al.
6,404,115 B1 6/2002 Sanderson
2016/0300684 A1* 10/2016 Feigelson ................. H01J 1/28
2017/0358419 A1 12/2017 Luhmann, Jr. et al.
2018/0350550 A1 12/2018 Terletska et al.

FOREIGN PATENT DOCUMENTS

JP H775142 B2 * 8/1995

* cited by examiner

*Primary Examiner* — Joseph L Williams
(74) *Attorney, Agent, or Firm* — Sheppard, Mullin, Richter & Hampton LLP

(57) ABSTRACT

A cathode heater assembly for use in a vacuum electronic device includes a refractive cup having a bottom portion and side walls forming a container; a cathode secured in the container of the refractive cup; and a heater wire coupled to the refractive cup. The cathode heater assembly may be manufactured by providing a refractive cup having a bottom portion and side walls forming a container; inserting a cathode pellet in the container of the refractive cup; impregnating the cathode pellet with electron emissive materials while the cathode pellet is in the container of the refractive cup; and attaching a heater wire to the refractive cup.

20 Claims, 8 Drawing Sheets

CATHODE HEATER ASSEMBLY AND METHOD OF MANUFACTURE

PRIORITY CLAIM

This application claims benefit of and hereby incorporates by reference provisional patent application Ser. No. 63/407,136, entitled "Cathode Heater Assembly and Method of Manufacture," filed on Sep. 15, 2022, by inventors McElroy et al., and provisional patent application Ser. No. 63/459,226, entitled "Cathode Heater Assembly," filed on Apr. 13, 2023, by inventors McElroy et al.

TECHNICAL FIELD

Embodiments of the invention relate generally to vacuum electronic devices, and more particularly provide a cathode heater assembly for use in vacuum electronic devices especially when operating at millimeter wave frequencies and higher.

BACKGROUND

Vacuum electronic devices take advantage of the interaction between one or more electron beams and one or more electromagnetic waves generated in an interaction region. A vacuum electronic device includes a vacuum chamber or cavity where the one or more electron beams is generated and focused, and where the interaction between the one or more electron beams and the one or more electromagnetic waves takes place. Examples of vacuum electron devices include, but are not limited to, particle accelerators, klystrons, gyrotrons, gyro-klystrons, travelling wave tubes (TWTs), gyro-TWTs, backward wave oscillators, magnetrons, cross-field amplifiers, free electron lasers, ubitrons, and the like.

An electron beam gun generates the electron beam in the vacuum environment. An example electron beam gun includes a thermionic electron emitter, often referred to as thermionic cathode. When the thermionic cathode is brought to a certain temperature, the thermionic cathode produces electrons on the cathode surface.

There are a range of cathode materials that have proven suitable for thermionic cathodes. Tungsten coated with barium oxide is sometimes used. Alternatively, a porous tungsten matrix impregnated with various oxides, often including barium oxide, aluminum oxide, and calcium oxide, may be used. In many cases, to improve electron emission characteristics, cathode materials may be coated with a thin layer of rare earth materials. Electron microscopes often use lanthanum hexaboride, tungsten, or tungsten coated with zirconium oxide as the thermionic electron emitter.

A heater is used to bring a thermionic cathode to a design temperature for electron emission to occur. Commonly, the heater includes a wire element located near or touching the thermionic cathode. Applying a voltage to the wire causes resistive voltage drop, dissipating some of the applied power into the wire. Through proper mechanical and thermal design, this power can be used to heat the thermionic cathode through conduction and/or radiation. Thermionic cathodes can also be heated by electron bombardment as well as laser heating.

Preferably, a thermionic cathode includes materials that provide a suitably low work function, such that when the thermionic cathode is brought to a given temperature, the thermal energy of electrons in the material is high enough to produce a desired current density on the cathode surface with application of voltage/potential/electric field. A lower work function allows a thermionic cathode to be operated at lower temperature to achieve the same emission current density at a given surface potential. This may offer advantages to the user, including increased product lifetime, simplified design, and/or possibly higher current density at an achievable temperature. Porous tungsten cathodes impregnated with oxides have been found to have lower work functions if a small amount of scandium or scandium oxide is present.

Methods for determining the relationship between work function, temperature, and current density are known to those skilled in the art of thermionic cathodes. Methods for extracting the current from the thermionic cathode through appropriate application of electric fields are also well known.

Various methods to manufacture thermionic cathodes have been developed, with varying performance. U.S. Pat. No. 10,714,292, entitled "Method of fabricating tungsten scandate nano-composite powder for cathodes", by Luhmann, Neville C., Gordon Soekland, Diana Gamzina, and Na Li and issued on Jul. 14, 2020 describes a method of producing nano-composite scandate tungsten (NST) cathodes that have been shown to reliably achieve effective work functions around 1.6 to 1.8. Methods prior to that achieved work functions as low as 1.1 with similar materials.

Cathode heater assemblies and methods of manufacturing cathode heater assemblies with lower work functions and high current density would be desirable.

SUMMARY

The present invention provides a cathode heater assembly for use in a vacuum electronic device comprises a refractive cup having a bottom portion and side walls forming a container; a cathode secured in the container of the refractive cup; and a heater wire coupled to the refractive cup.

The heater wire may be coupled to an external bottom surface of the bottom portion of the refractive cup. The refractive cup may include one or more openings to manage excess material flow. The heater wire may be shaped as a ribbon. The cathode may include a nano-scandate tungsten (NST) pellet impregnated with electron emissive materials. The cathode may be impregnated with the electron emissive materials while in the refractive cup. The emitting surface of the cathode and a top portion of the side walls of the refractive cup may be coplanar. The heater wire may be coupled to the refractive cup using a laser weld or an electron beam weld. The vacuum electronic device may include a linear beam tube, a travelling wave tube, a klystron or a backward wave oscillator.

The present invention further provides a method of manufacturing a cathode heater assembly comprising providing a refractive cup having a bottom portion and side walls forming a container; inserting a cathode pellet in the container of the refractive cup; impregnating the cathode pellet with electron emissive materials while the cathode pellet is in the container of the refractive cup; and attaching a heater wire to the refractive cup.

The attaching the heater wire to the refractive cup may include attaching the heater wire to a bottom surface of the bottom portion of the refractive cup. The attaching the heater wire to the refractive cup may occur prior the inserting the cathode pellet in the container. The attaching the heater wire to the refractive cup may occur after the inserting the cathode pellet in the container. The method may further comprise securing the cathode pellet in the container. The securing the cathode pellet in the container may include using braze material, welding and/or using the electron emissive materials.

DETAILED DESCRIPTION

This document describes example cathode heater assemblies with low work function and high current density and methods of manufacturing the cathode heater assemblies. The approach provides cathode heater assemblies that achieve desired cathode temperatures with low applied power and simple components. The techniques described herein are especially beneficial for vacuum electron devices, such as TWTs and klystrons, as well as electron microscopy and lithography machines. Low power consumption of the design enables deployment on power limited platforms. Simplicity of the components and assembly enables cost reduction.

Figure 1:
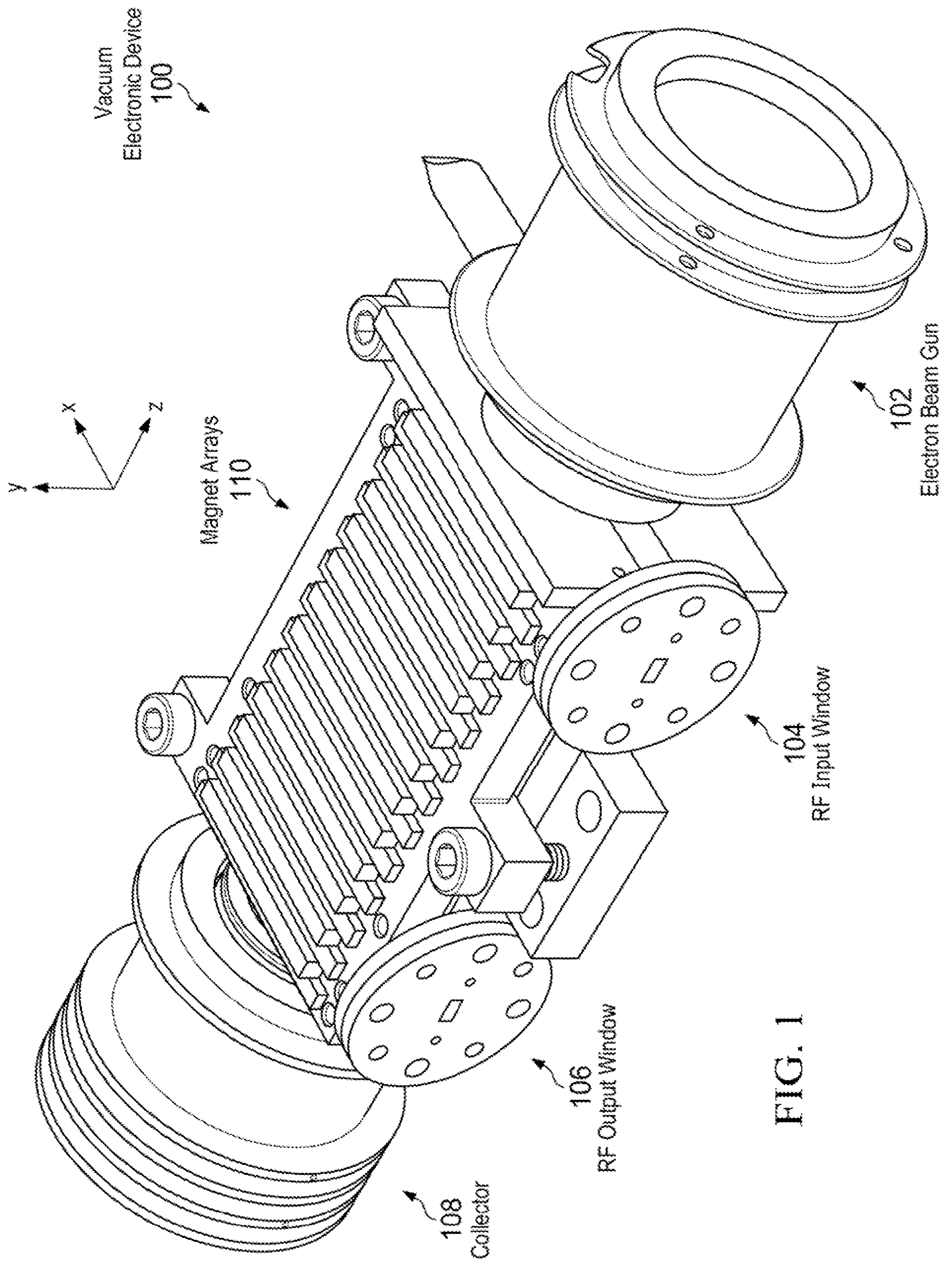
FIG. 1 is a diagram illustrating an example vacuum electron device, e.g., an example traveling wave tube (TWT), in accordance with embodiments of the present invention.

FIG. 1 illustrates an example vacuum electronic device 100, e.g., a traveling wave tube (TWT) 100, in accordance with embodiments of the present invention. Although FIG. 1 is shown with regard to a TWT, the cathode heater assembly described herein can be used in different vacuum electronic devices 100.

As shown, the vacuum electronic device 100 includes an electron beam gun 102 configured to generate one or more electron beams (transmitted in the z-direction). The electron beam gun 102 may be employed for sheet beams, hollow beams, pencil beams, distributed beams, multiple beams, etc. The vacuum electronic device 100 further includes an interaction circuit, including an RF input window 104, an RF output window 106, and magnet arrays 110 configured to direct and shape the one or more electron beams through the interaction circuit. The vacuum electronic device 100 further includes a collector 108 configured to collect the one or more electron beams being transmitted through the vacuum electronic device 100.

Figure 2:
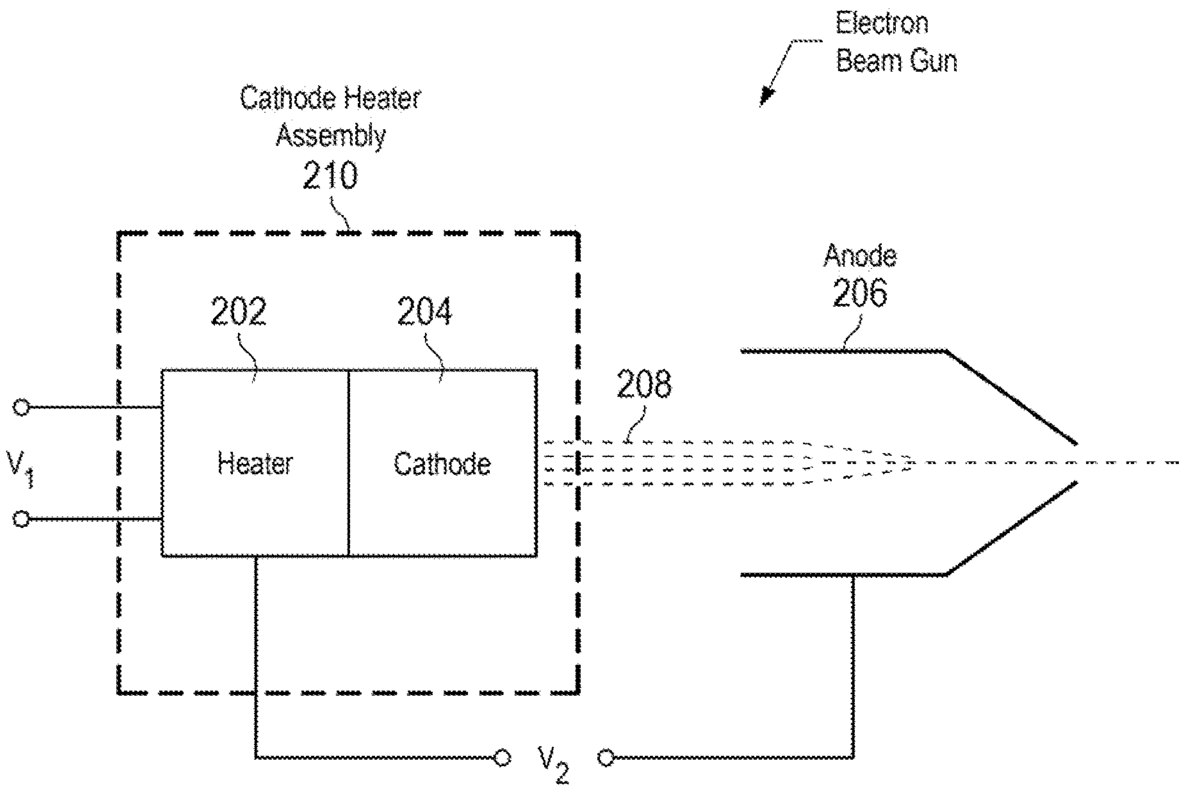
FIG. 2 is a diagram illustrating an example electron beam gun, in accordance with embodiments of the present invention.

FIG. 2 is a diagram illustrating an example electron beam gun 102, in accordance with embodiments of the present invention. The electron beam gun 102 includes a heater 202, a cathode 204 in contact with the heater 202, and an anode section 206 (which may include one or more pre-accelerating anodes, one or more focusing anodes, and/or one or more accelerating anodes). A voltage V1 may be applied to the heater 202 to heat the cathode 204. A voltage V2 may be applied to the anode section 206 to focus and direct the electrons in an electron beam 208 across the interaction circuit. The heater 202 and cathode 204 are referred to herein as a cathode heater assembly 210.

Figure 3:
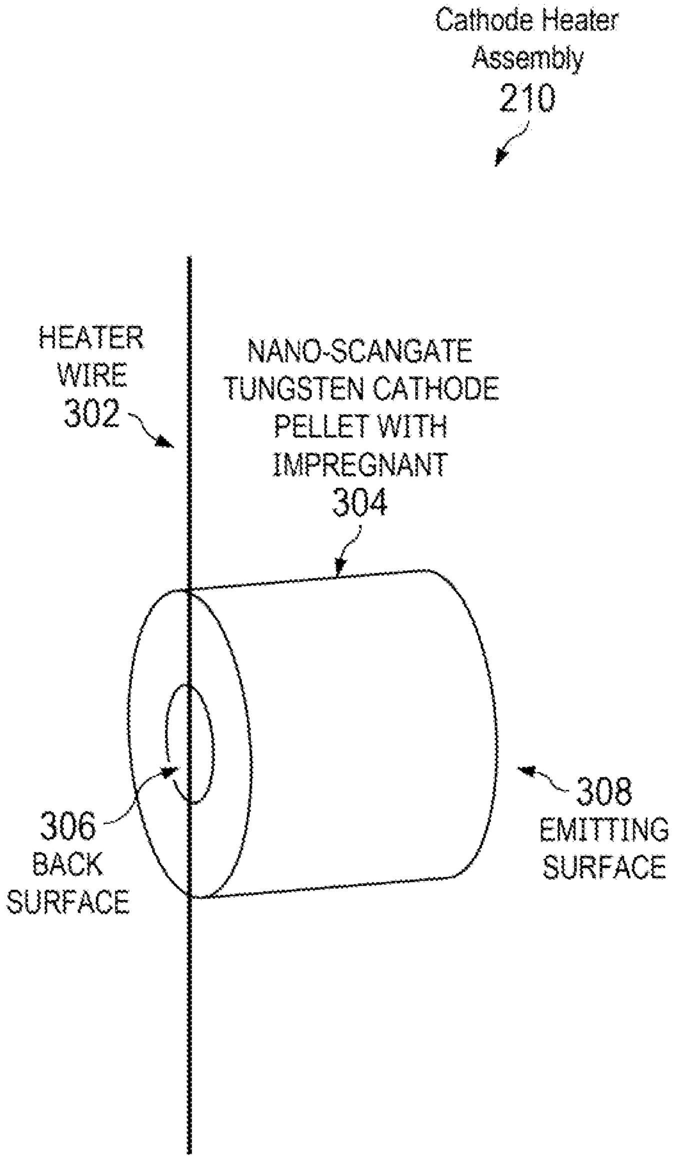
FIG. 3 is a diagram illustrating an example cathode heater assembly, in accordance with embodiments of the present invention.

FIG. 3 is a diagram illustrating an example cathode heater assembly 210, in accordance with embodiments of the present invention. The cathode heater assembly 210 includes a heater wire 302 coupled to the back surface 306 of a nano-scandate tungsten (NST) cathode (cathode pellet) 304. The cathode 304 includes an emitting surface 308 on its front surface. The heater wire 302 may be coupled to the back surface 306 of the cathode 304 using a laser weld or electron beam weld.

The heater wire 302 can be made of any conductive material with suitably high melting point and structural rigidity. Example materials may include tungsten, tungsten rhenium, molybdenum-rhenium, molybdenum-ruthenium, molybdenum-cobalt, molybdenum-nickel and/or combinations of these materials. The heater wire 302 material may be chosen based on melting temperature, resistivity, workability at room temperatures, and lifetime at operating temperatures. The ends of the heater wire 302 may be secured to isolated structures to mechanically locate the cathode emitting surface 308. The diameter of the heater wire 302 may be chosen to achieve a desired power drop, so that the cathode heater assembly 210, when placed in its operating environment, achieves a desired temperature.

The cathode (cathode pellet) 304 may comprise an NST sintered matrix of 10% to 50% porosity, impregnated with barium-calcium-aluminate (a mixture of BaO, CaO, and $Al_2O_3$) impregnant to form a composite material emitter. The NST sintered matrix may be made of NST powder comprising micron-sized (100 nm to 10 microns) tungsten particles and nano-sized scandium oxide (10 nm to 2 microns), which has been sintered at elevated temperature to create the desired porous matrix. Example cathodes 304 can be manufactured as described in U.S. Pat. No. 10,714,292, entitled "Method of fabricating tungsten scandate nano-composite powder for cathodes", by Luhmann, Neville C., Gordon Soekland, Diana Gamzina, and Na Li and issued on Jul. 14, 2020.

In some embodiments, the type of attachment of the heater wire 302 to the cathode 304 meets certain criteria. The attachment type preferably survives the high operating temperature of the heater wire 302, which is often hundreds of degrees Celsius above the cathode emitting surface 308 temperature, and survives a large number of cycles from room temperature to operating temperature. Meeting this condition eliminates many attachment types. Second, the attachment type preferably does not compromise the low work function conditions of the cathode 304. If the cathode 304 is small, it will not take much power to heat the cathode 304, including the cathode emitting surface 308, to a temperature which can cause irreversible changes. For example, in the absence of any cooling, a 5 mg cathode pellet 304 formed of pure tungsten will reach 1500 Celsius with the uniform instantaneous application of 1 Joule of power.

To achieve a successful attachment, power may be applied to bring the heater wire material, cathode material or both to its melting point, however, without causing the emitting surface 308 of the cathode 304 to reach an unacceptable temperature. The use of laser welding or electron beam welding allows a precise amount of heat to be applied at a precise location—in this case, to the interface between heater wire 302 and the back surface of the cathode 304. Through proper choice of welding parameters, securing the two components while maintaining an acceptable temperature of the emitting surface 308 is achievable.

Figure 4:
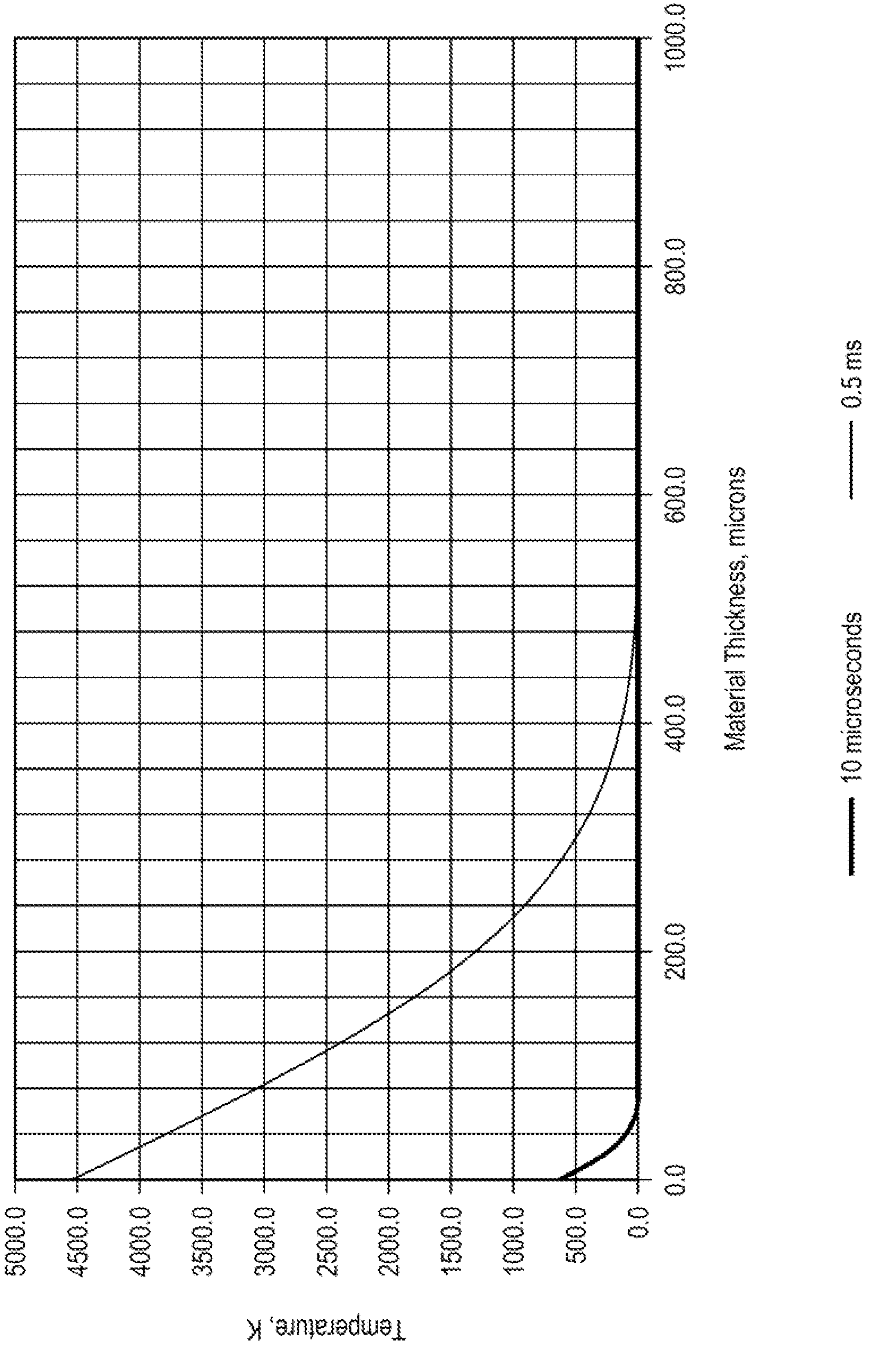
FIG. 4 is a diagram that shows the temperature rise in pure tungsten material when 0.7 Joule is applied to the exposed surface in a semi-infinite model.

FIG. 4 is a diagram that shows the temperature rise in pure tungsten material when 0.7 Joules is applied to the exposed surface in a semi-infinite model. If the material surface is located at least 500 microns away from the back surface 306 on which the weld is performed, the temperature rise on the cathode emitting surface 308 will be below 100 Celsius. Keeping the temperature of the emitting surface 308 low protects the cathode emitting surface 308 from getting contaminated during the welding process.

Figure 5:
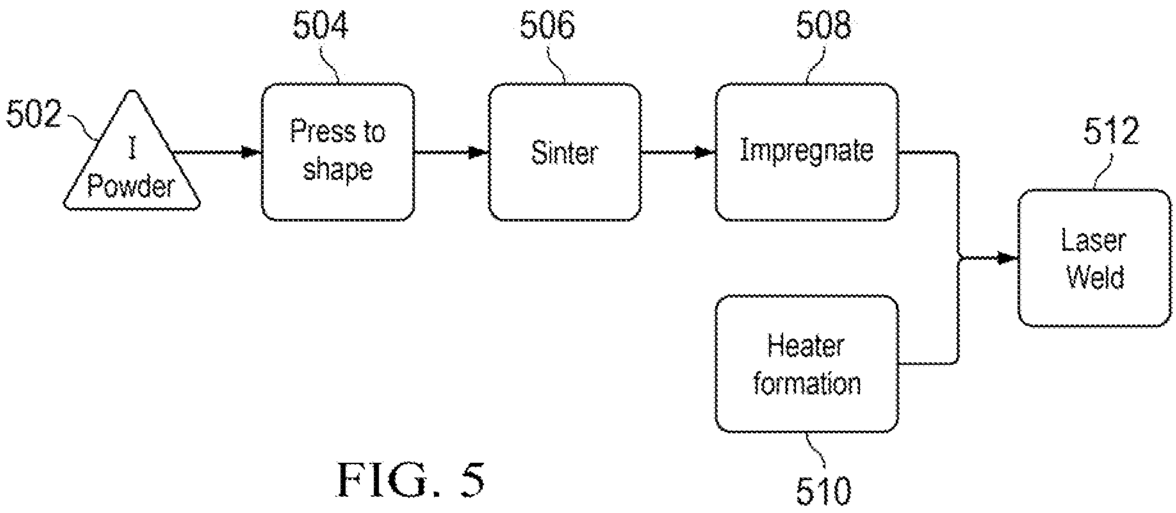
FIG. 5 is a process diagram illustrating a method of fabricating laser-welded cathode heater assembly of FIG. 3, in accordance with embodiments of the present invention.

FIG. 5 is a process diagram illustrating a method of fabricating the cathode heater assembly 210, in accordance with embodiments of the present invention. NST powder (or pure tungsten powder) 502 in step 504 is pressed in a manner to shape the NST pellet 304. In step 506, the NST pellet 304 is sintered. In step 508, the NST pellet 304 is impregnated with electron emissive materials, such as barium calcium aluminates. In step 510, the heater wire 302 is formed. In step 512, the heater wire 302 is laser welded (or electron beam welded) to the NST pellet 304, thereby forming a cathode heater assembly 210. In some embodiment, the laser weld includes a single pulse of 1.5 kW for 500 microseconds.

Figure 6A:
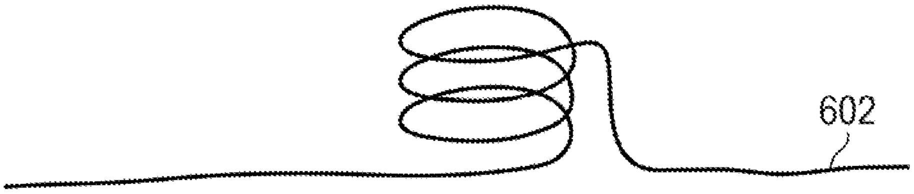
FIG. 6*a* illustrates a side view of a coiled heater wire, in accordance with some embodiments of the invention.
Figure 6B:
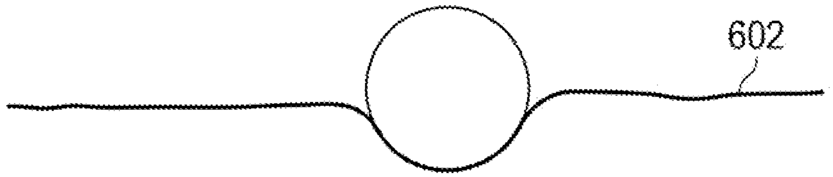
FIG. 6*b* illustrates a top view of the coiled heater wire, in accordance with some embodiments of the invention.

FIG. 6*a* illustrates a side view of a coiled heater wire 602, in accordance with some embodiments of the invention. FIG. 6*b* illustrates a top view of the coiled heater wire 602, in accordance with some embodiments of the invention. In some embodiments, the coiled heater wire 602 may be formed by winding a wire on a mandrel. The coil of the coiled heater wire 602 may be used to mechanically clamp itself to a cathode 604, with or without a laser weld and/or electron beam weld.

Figure 7:
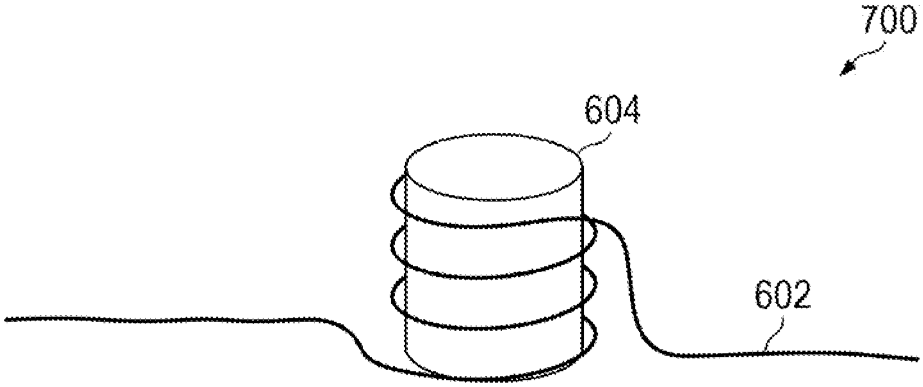
FIG. 7 is a diagram illustrating an example cathode heater assembly with the coiled heater wire of FIGS. 6*a* and 6*b*, in accordance with embodiments of the present invention.

FIG. 7 illustrates a coiled heater cathode assembly 700, in accordance with some embodiments of the invention. The cathode 604 may be inserted into the coiled heater wire 602 to form the coiled heater cathode assembly 700. In some embodiments, the cathode 604 may be the same as or similar to cathode 304 (same or similar material, same or similar shape, etc.). In some embodiments, the cathode 604 and coiled heater wire 602 can be attached without welding. In some embodiments, the heater wire 602 may be coiled directly around the cathode 304 to create a tight mechanical coupling therebetween. In some embodiments, the coiled heater wire 602 may be affixed to the cathode 604 using a laser weld or electron beam weld.

Figure 8:
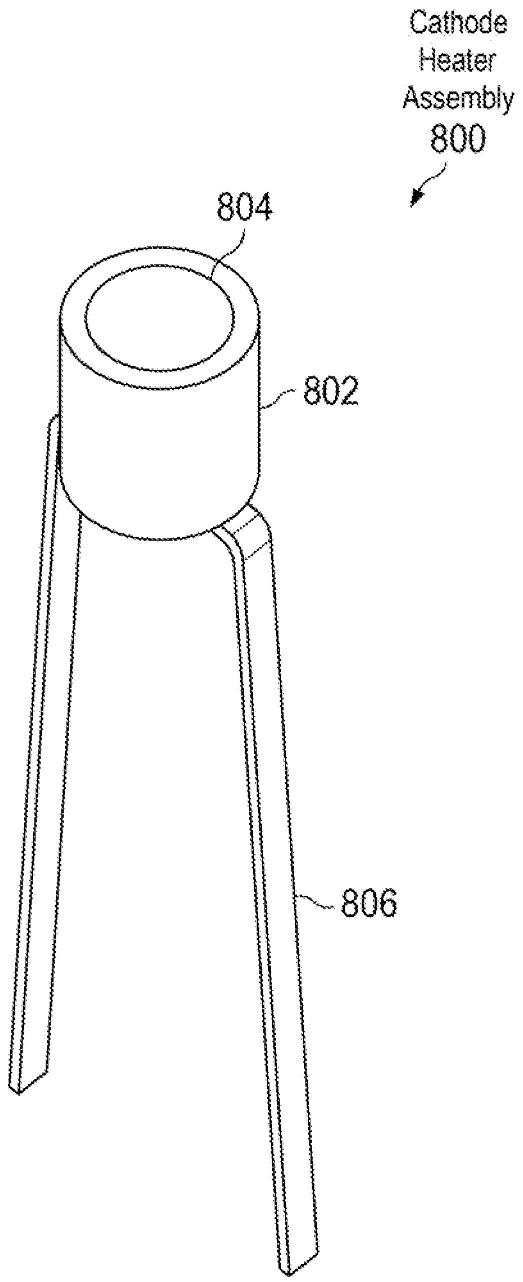
FIG. 8 is a diagram illustrating a perspective view of an example cathode heater assembly, in accordance with embodiments of the present invention.

FIG. 8 is a diagram illustrating a perspective view of a cathode heater assembly 800, in accordance with embodiments of the present invention.

The cathode heater assembly 800 includes a heater wire 806, a refractive cup 802 attached to the heater wire 806, and a cathode 804 contained inside the refractive cup 802. In some embodiments, the heater wire 806 may be in the shape of a ribbon, although other shapes are also possible. The refractive cup 802 may include an bottom portion and side walls together forming a container. In some embodiments, the top surface of the side walls of the refractive cup 802 and the emitting surface of the cathode 804 form a single surface in a single plane. In other embodiments, they form different surfaces in different planes. In some embodiments, the different planes are parallel, although in other embodiments they may not be parallel.

To manufacture the cathode heater assembly 800, a cathode pellet may be formed of a certain size. The cathode 804 can be the size of the container of the refractive cup 802 or slightly taller or shorter depending on the purpose of the electron emitter. The cathode pellet may be secured inside the refractive cup 802 using either braze material or electron emissive materials or welding techniques. In some embodiments, the cathode pellet is impregnated with electron emissive materials directly into the refractive cup 802 to turn the cathode pellet into the cathode 804 and secure the cathode 804 in the refractive cup 802. In some embodiments, the surface can be polished to achieve an extremely uniform emitting surface.

In some embodiments, the refractive cup 802 is made of metal. In some embodiments, the refractive cup 802 is made of an alloy of titanium-zirconium-molybdenum (TZM), molybdenum, and/or tungsten. The heater wire 806 may then be secured to the refractive cup 802. The shape of the heater wire 806 can be optimized via machining, chemical etching, or laser/e-beam cutting techniques to provide concentrated heating while optimizing power efficiency. The heater wire 806 may be made of molybdenum-rhenium.

The heater wire 806 may be attached to the refractive cup 802 using a laser weld and/or electron beam weld. In some embodiments, the heater wire 806 may be attached to the external bottom surface of the bottom portion of the refractive cup 802. In other embodiments, the heater wire 806 may be attached to the external surface of the side walls of the refractive cup 802. In some embodiments, the heater wire 806 may be attached inside the container, e.g., to the internal bottom surface of the bottom portion or to the internal surface of the side walls. Attaching the heater wire 806 to the refractive cup 802 rather than directly to the cathode 804 prevents the cathode 804 from being affected by the attachment operation (e.g., welding), which reduces its emission parameters and lifetime. In some embodiments, the attachment occurs prior to the cathode 804 being positioned inside the refractive cup 802. In some embodiments, the attachment occurring after the cathode is inserted into the refractive cup 802.

In some embodiments, the refractive cup 802 can have additional openings to allow excess braze or emissive materials to freely flow or provide additional securing tabs to the cathode 804. The refractive cup 802 may serve to form a tightly attached focusing electrode solving decades long challenge of edge emission on thermionic emitters. Edge emission generates stray electrons that cause interception, reduce efficiency and add heat loads onto the anode and circuits.

The use of a refractive cup 802 results in a robust lightweight cathode heating assembly 800 that enables high quality emission, ease of manufacturing, and increased product lifetime. While a simple refractive cup shape is shown here, more complex geometries can be employed to generate and/or increase electron focusing. For example, a Pierce angle can be used at the edges to help shape the beam and/or radius corners to reduce gradients.

Figure 9:
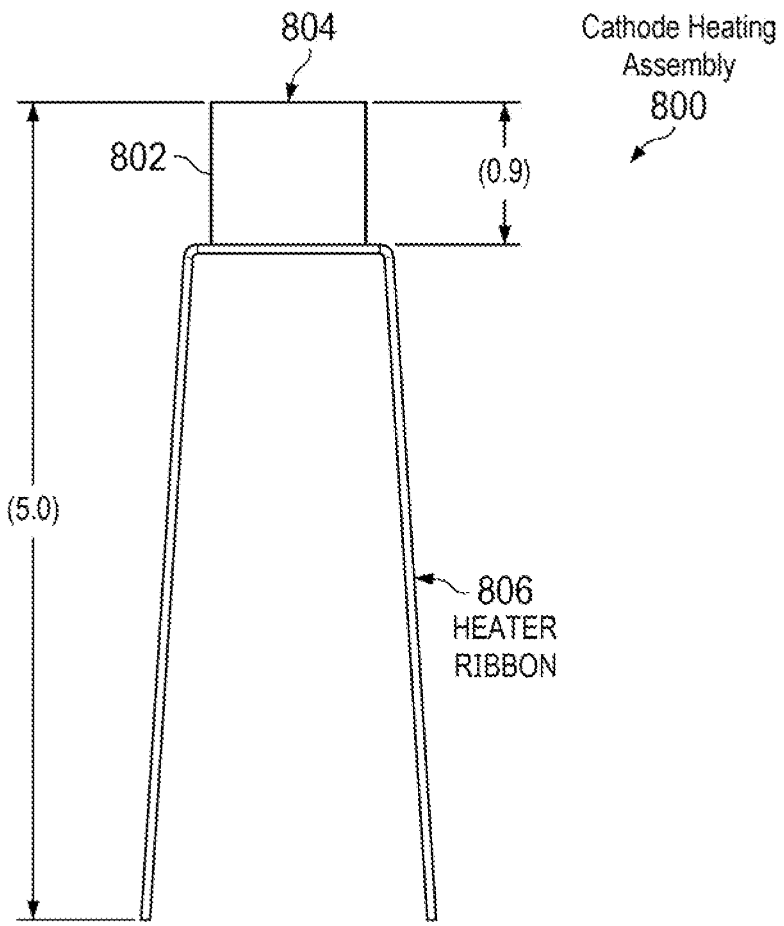
FIG. 9 is a diagram illustrating a side view of the cathode heater assembly of FIG. 8, in accordance with embodiments of the present invention.

FIG. 9 is a diagram illustrating a side view of a cathode heater assembly 800, in accordance with embodiments of the present invention. As stated above, the cathode heater assembly 800 includes a heater wire 806, a refractive cup 802 and a cathode 804 (not shown) contained inside the refractive cup 802. As shown, in some embodiments, the refractive cup 802 has a height of 0.9 mm. Other dimensions are also possible.

Figure 10:
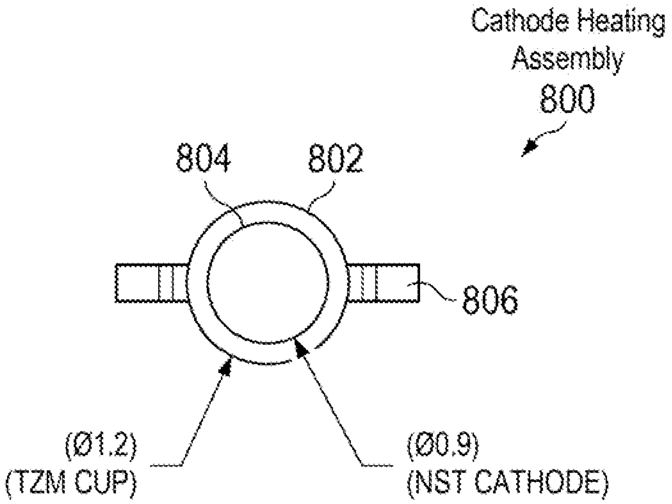
FIG. 10 is a diagram illustrating a top view of a cathode heater assembly of FIG. 8, in accordance with embodiments of the present invention.

FIG. 10 is a diagram illustrating a top view of a cathode heater assembly 800, in accordance with embodiments of the present invention. As stated above, the cathode heater assembly 800 includes a heater wire 806, a refractive cup 802 and a cathode 804 contained inside the refractive cup 802. As shown, in some embodiments, the refractive cup 802 has a diameter of 1.2 mm, and the cathode 804 has a diameter of 0.9 mm. Other dimensions are also possible.

In some embodiments, the present invention provides a cathode heater assembly, comprising a nano-scandate tungsten cathode, made of a high temperature sintered matrix of NST powder including or alternatively consisting of micron-sized (100 nm to 10 microns) tungsten particles and nano-sized scandium oxide (10 nm to 2 microns) of 10% to 50% porosity, impregnated with barium-calcium-aluminate (a mixture of BaO, CaO, and $Al_2O_3$) impregnant to form a composite material emitter; a piece of conductive material as a heater wire comprising a cross section chosen to dissipate the right power to heat the cathode; and attachment of the cathode and heater to each other through laser welding or electron beam welding.

In some embodiments, the present invention provides a cathode heater assembly, comprising a nano-scandate tungsten cathode, made of a high temperature sintered matrix of NST powder consisting of micron sized (100 nm to 10 microns) tungsten particles and nanosized scandium oxide (10 nm to 2 microns) of 10% to 50% porosity, impregnated with barium-calcium-aluminate (a mixture of BaO, CaO, and $Al_2O_3$) impregnant to form a composite material emitter; a piece of conductive material as a heater wire comprising a cross section chosen to dissipate the right power to heat the cathode; and attachment of the cathode and heater to each other through mechanical clamping with the wire wrapped in a spiral.

NST power is made of micron-sized and nano-sized particles that create a porous matrix with pores of micron sizes that are interconnected. This is important for electron emissive material flow to the surface of the cathode when it operates. The cathodes are sintered, and because they are made of small particles, if they are exposed to high temperatures for a prolonged period of time, the pores will close up, making a denser matrix and closing paths for electron emissive materials to flow to the surface. Direct, specifically laser welding or electron beam welding, can deposit energy in a very small amount of time and at a very targeted location on the back surface of the cathode and hence not affect its porous structure. Mechanically clamping the heating wire to the cathode, such as using a spiral winding, avoids the step of heating the cathode. Using a cup also reduces application of heat to the cathode, thereby protect the NST material's porous nature.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. A cathode heater assembly for use in a vacuum electronic device, the cathode heater assembly comprising:
- a refractive cup having a bottom portion and side walls forming a container having a container height and a cup top surface;
- a cathode secured in the container of the refractive cup, the cathode having a cathode height no taller than the container height and having a cathode emitting surface positioned coplanar to the cup top surface or within the container; and
- a heater wire welded to the refractive cup.

2. The cathode heater assembly of claim 1, wherein the heater wire is welded to an external bottom surface of the bottom portion of the refractive cup.

3. The cathode heater assembly of claim 1, wherein the refractive cup includes one or more openings to manage excess material flow.

4. The cathode heater assembly of claim 1, wherein the heater wire is shaped as a ribbon.

5. The cathode heater assembly of claim 1, wherein the cathode includes a nano-scandate tungsten (NST) pellet impregnated with electron emissive materials.

6. The cathode heater assembly of claim 5, wherein the cathode is impregnated with the electron emissive materials after being secured in the refractive cup.

7. The cathode heater assembly of claim 1, wherein the heater wire is welded to the refractive cup using a laser weld or an electron beam weld.

8. The cathode heater assembly of claim 1, wherein the vacuum electronic device includes a linear beam tube.

9. The cathode heater assembly of claim 1, wherein the vacuum electronic device includes a travelling wave tube.

10. The cathode heater assembly of claim 1, wherein the vacuum electronic device includes a klystron.

11. The cathode heater assembly of claim 1, wherein the vacuum electronic device includes a backward wave oscillator.

12. A method of fabricating a cathode heater assembly for use in a vacuum electronic device, the method comprising:
- providing a refractive cup having a bottom portion and side walls forming a container having a container height and a cup top surface;
- inserting a cathode pellet in the container of the refractive cup, the cathode pellet having a cathode height no taller than the container height and having a cathode emitting surface positioned coplanar to the cup top surface or within the container;
- impregnating the cathode pellet with electron emissive materials after inserting the cathode pellet in the container of the refractive cup; and
- welding a heater wire to the refractive cup.

13. The method of claim 12, wherein the welding the heater wire to the refractive cup includes welding the heater wire to an external bottom surface of the bottom portion of the refractive cup.

14. The method of claim 12, wherein the welding the heater wire to the refractive cup occurs prior to the inserting the cathode pellet in the container.

15. The method of claim 12, wherein the welding the heater wire to the refractive cup occurs after the inserting the cathode pellet in the container.

16. The method of claim 12, further comprising the cathode pellet in the container using braze material.

17. The method of claim 12, further comprising welding the cathode pellet in the container.

18. The method of claim 12, wherein the impregnating the cathode pellet with the electron emissive materials secures the cathode pellet in the container.

19. A cathode heater assembly, comprising:

a nano-scandate tungsten (NST) cathode made of a high temperature sintered matrix of NST powder including micron-sized tungsten particles and nano-sized scandium oxide of 10% to 50% porosity, and impregnated with barium-calcium-aluminate impregnant to form a composite material emitter; and a heater wire having a cross section configured to dissipate power to heat the NST cathode to cause the NST cathode to emit electrons, the heater wire being attached directly to the NST cathode through at least one of laser welding or electron beam welding.

20. A cathode heater assembly, comprising:

a nano-scandate tungsten (NST) cathode made of a high temperature sintered matrix of NST powder including micron-sized tungsten particles and nano-sized scandium oxide of 10% to 50% porosity, and impregnated with barium-calcium-aluminate impregnant to form a composite material emitter; and a heater wire having a cross section configured to dissipate power to heat the NST cathode to cause the NST cathode to emit electrons, the heater wire being attached to the NST cathode through mechanical clamping with the heater wire wrapped in a spiral directly around the NST cathode.

* * * * *